(12) United States Patent
Tsutsui

(10) Patent No.: US 8,175,340 B2
(45) Date of Patent: May 8, 2012

(54) MAP INFORMATION DISPLAY APPARATUS, MAP INFORMATION DISPLAY METHOD, AND PROGRAM

(75) Inventor: Masanao Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 957 days.

(21) Appl. No.: 12/179,102

(22) Filed: Jul. 24, 2008

(65) Prior Publication Data

US 2009/0060263 A1 Mar. 5, 2009

(30) Foreign Application Priority Data

Sep. 4, 2007 (JP) ................................. 2007-228577

(51) Int. Cl.
*G06K 9/00* (2006.01)
*H04N 7/00* (2011.01)
*G01C 21/30* (2006.01)

(52) U.S. Cl. .......................... 382/113; 348/113; 701/208

(58) Field of Classification Search .................. 382/100, 382/113, 305, 312; 348/113, 116, 220.1, 348/231.2; 701/200, 201, 208, 209, 210, 701/213; 715/855

See application file for complete search history.

(56) References Cited

U.S. PATENT DOCUMENTS

| | | | |
|---|---|---|---|
| 6,208,935 B1 * | 3/2001 | Yamada et al. ............... | 701/209 |
| 6,289,278 B1 * | 9/2001 | Endo et al. ..................... | 701/208 |
| 6,810,326 B1 * | 10/2004 | Kawasaki ...................... | 701/209 |
| 6,933,969 B1 * | 8/2005 | Noguchi et al. ............ | 348/220.1 |
| 7,561,964 B2 * | 7/2009 | Vu ................................ | 701/210 |
| 7,636,629 B2 * | 12/2009 | Tajima et al. ................. | 701/200 |
| 7,663,671 B2 * | 2/2010 | Gallagher et al. .......... | 348/231.2 |
| 7,822,539 B2 * | 10/2010 | Akiyoshi et al. .............. | 701/201 |
| 7,962,280 B2 * | 6/2011 | Kindo et al. ................... | 701/208 |
| 7,984,389 B2 * | 7/2011 | Rusu et al. ..................... | 715/855 |

FOREIGN PATENT DOCUMENTS

| | | |
|---|---|---|
| JP | 8-77192 | 3/1996 |
| JP | 9-179491 | 7/1997 |
| JP | 10-285515 | 10/1998 |
| JP | 2001-282813 | 10/2001 |
| JP | 2001-290820 | 10/2001 |
| JP | 2002-277255 | 9/2002 |
| JP | 2002-278993 | 9/2002 |
| JP | 2002-341755 | 11/2002 |
| JP | 2005-94810 | 4/2005 |
| JP | 2006-148514 | 6/2006 |
| JP | 2007-129407 | 5/2007 |
| JP | 2007-156849 | 6/2007 |

* cited by examiner

*Primary Examiner* — Kanjibhai Patel
(74) *Attorney, Agent, or Firm* — Oblon, Spivak, McClelland, Maier & Neustadt, L.L.P.

(57) ABSTRACT

A map information display apparatus for displaying map information on the basis of information on image-capturing times and image-capturing positions that are respectively associated with a plurality of captured images includes a captured image extraction unit configured to extract images captured within a predetermined time period that includes the image-capturing time of a predetermined captured image from among the plurality of captured images; a map area selection unit configured to select an area of a map so as to include the image-capturing positions of the captured images extracted by the captured image extraction unit by using as a reference the image-capturing position of the predetermined captured image; and a map information display unit configured to display map information in such a manner that the area of the map, which is selected by the map area selection unit, is displayed.

14 Claims, 7 Drawing Sheets

BEFORE SELECTION

AFTER SELECTION

BEFORE SELECTION

AFTER SELECTION

MAP INFORMATION DISPLAY APPARATUS, MAP INFORMATION DISPLAY METHOD, AND PROGRAM

CROSS REFERENCES TO RELATED APPLICATIONS

The present invention contains subject matter related to Japanese Patent Application JP 2007-228577 filed in the Japanese Patent Office on Sep. 4, 2007, the entire contents of which are incorporated herein by reference.

BACKGROUND OF THE INVENTION

1. Field of the Invention

The present invention relates to a map information display apparatus, a map information display method, and a program.

2. Description of the Related Art

In recent years, with the rapid development of wireless communication technology and information processing technology, various information processing functions have been made available in small devices, such as portable terminals and image-capturing devices. For example, some image-capturing devices are installed with a position information obtaining function, such as a global positioning system (GPS), so that position information can be added to captured images and recorded. As a result, it is possible for a user to rearrange captured images on the basis of information, such as places and dates and times at which images of subjects were captured. In the current situation, captured images to which information concerning image-capturing places and image-capturing dates and times has been added are often viewed using information processing devices, such as personal computers (PCs). For example, the user uses captured images to look back on memories of a trip while displaying a desired image-capturing place on a map on the basis of additional information, such as other image-capturing places and image-capturing dates and times and looking at the captured images together.

However, when an image-capturing place is desired to be confirmed at the place where the user is staying while on a trip, often, the user is not carrying a PC or the like. In such a case, the user may desire that a map be displayed by using a display device of the image-capturing device or by using a display device of another small device, and that the image-capturing place be displayed on that device. However, when the display device of an image-capturing device or the like is used, if the display area of map information, or the like is not appropriately displayed, there occurs a necessity for the user to frequently perform operations, such as scrolling, expansion/reduction, and the like.

In view of such problems, for example, Japanese Unexamined Patent Application Publication No. 2001-290820 discloses a technology in which, by referring to a video database in which video data and position/time data are associated with each other, video data whose image-capturing position is included in a map displayed in a fixed display area on the screen of a device is searched for, and the image-capturing positions of the video data are displayed as symbols connected by tracks.

SUMMARY OF THE INVENTION

However, when map information is to be displayed with an image-capturing place of a particular captured image being displayed in the center of a screen, if the display area thereof and the scale of the map are fixed, there are cases in which it is difficult for the user to obtain desired high-precision information. Furthermore, there is a possibility that it is difficult for the user to obtain desired map information. For example, when map information is to be displayed in such a manner that the image-capturing place of the image captured within a predetermined time period is displayed, it is necessary for the user to repeatedly perform operations, such as the expansion/reduction of the display area and scrolling of the screen, with the result that the convenience to the user is greatly deteriorated. For this reason, there has been a demand for a map information display technology for displaying map information of a suitable area on the basis of information on image-capturing dates and times and image-capturing places of captured images.

The present invention has been made in view of the above-described problems. Accordingly, it is desirable to provide a new and improved map information display apparatus, a new and improved map information display method, and a new and improved program, which are capable of displaying map information in which the image-capturing location of an image captured within a predetermined time period is contained on the basis of information on the image-capturing date and time and the image-capturing place of the captured image.

According to an embodiment of the present invention, there is provided a map information display apparatus for displaying map information on the basis of information on image-capturing times and image-capturing positions that are respectively associated with a plurality of captured images. The map information display apparatus includes a captured image extraction unit configured to extract images captured within a predetermined time period that includes the image-capturing time of a predetermined captured image from among the plurality of captured images; a map area selection unit configured to select an area of a map so as to include the image-capturing positions of the captured images extracted by the captured image extraction unit by using as a reference the image-capturing position of the predetermined captured image; and a map information display unit configured to display map information in such a manner as to include the area of the map that is selected by the map area selection unit.

The map area selection unit may select the area of the map so as to include the image-capturing positions of the captured images extracted by the captured image extraction unit with the image-capturing position of the predetermined captured image being the center of the area of the map.

The map information display apparatus may further include an indicator information display unit configured to display first indicator information indicating the image-capturing position of the predetermined captured image within the map information.

The indicator information display unit may display, as the first indicator information, a thumbnail of the predetermined captured image or an icon corresponding to the image-capturing position of the predetermined captured image.

The indicator information display unit may display second indicator information indicating the image-capturing positions of the captured images extracted by the captured image extraction unit within the map information.

The indicator information display unit may display, as the second indicator information, thumbnails of the captured images extracted by the captured image extraction unit or icons corresponding to the image-capturing positions of the captured images.

The map information display apparatus may further include an image information display unit configured to display the predetermined captured image or a thumbnail of the captured image in a display area differing from a display area in which the map information is displayed by the map information display unit.

The predetermined captured image may be a most recently captured image among the plurality of captured images.

The map information display apparatus may further include a route information obtaining unit configured to obtain route information indicating information on a route moved in the process of obtaining the plurality of captured images; and a route information extraction unit configured to extract the route information obtained within the predetermined time period. The map area selection unit may select, by using the image-capturing position of the predetermined captured image as a reference, an area of a map in which image-capturing positions of the captured images extracted by the captured image extraction unit and an obtained position of the route information extracted by the route information extraction unit are contained.

The map information display apparatus may further include an indicator information display unit configured to display third indicator information indicating the obtained position of the route information extracted by the route information extraction unit within the map information.

The map information display apparatus may further include a changed-image-position determination unit configured to, when the predetermined captured image is changed to another captured image among the plurality of captured images, determine whether or not the image-capturing position of the other captured image is positioned within the area selected by the map area selection unit. The map area selection unit may not change the area of the map when the changed-image-position determination unit determines that the other captured image is positioned within the selected area, and may change the area of the map so that the other captured image is used as a reference when the changed-image-position determination unit determines that the other captured image is positioned outside the selected area.

According to another embodiment of the present invention, there is provided a map information display apparatus including a center-of-gravity position computation unit configured to compute a center-of-gravity position of the image-capturing positions of a predetermined number of captured images selected from among the plurality of captured images; a map area selection unit configured to select an area of the map in which the image-capturing positions of the predetermined number of captured images are contained by using the center-of-gravity position as a reference; and a map information display unit configured to display map information in such a manner as to include the area of the map that is selected by the map area selection unit.

According to another embodiment of the present invention, there is provided a map information display method for displaying map information on the basis of information on image-capturing times and image-capturing positions that are respectively associated with a plurality of captured images. The map information display method includes the steps of: extracting images captured within a predetermined time period in which an image-capturing time of a predetermined captured image is contained from among the plurality of captured images; selecting an area of a map so as to include the image-capturing position of the captured image extracted in the captured image extraction by using as a reference the image-capturing position of the predetermined captured image; and displaying map information in such a manner as to include the area of the map that is selected in the map area selection.

According to another embodiment of the present invention, there is provided a program for causing a computer to implement functions of the map information display apparatus. In addition, a recording medium on which the program is recorded is provided.

As has been described above, according to the embodiments of the present invention, it is possible to display map information in which the image-capturing location of an image captured within a predetermined time period is contained on the basis of information on the image-capturing date and time and the image-capturing place of the captured image.

DESCRIPTION OF THE PREFERRED EMBODIMENTS

Figure 1:
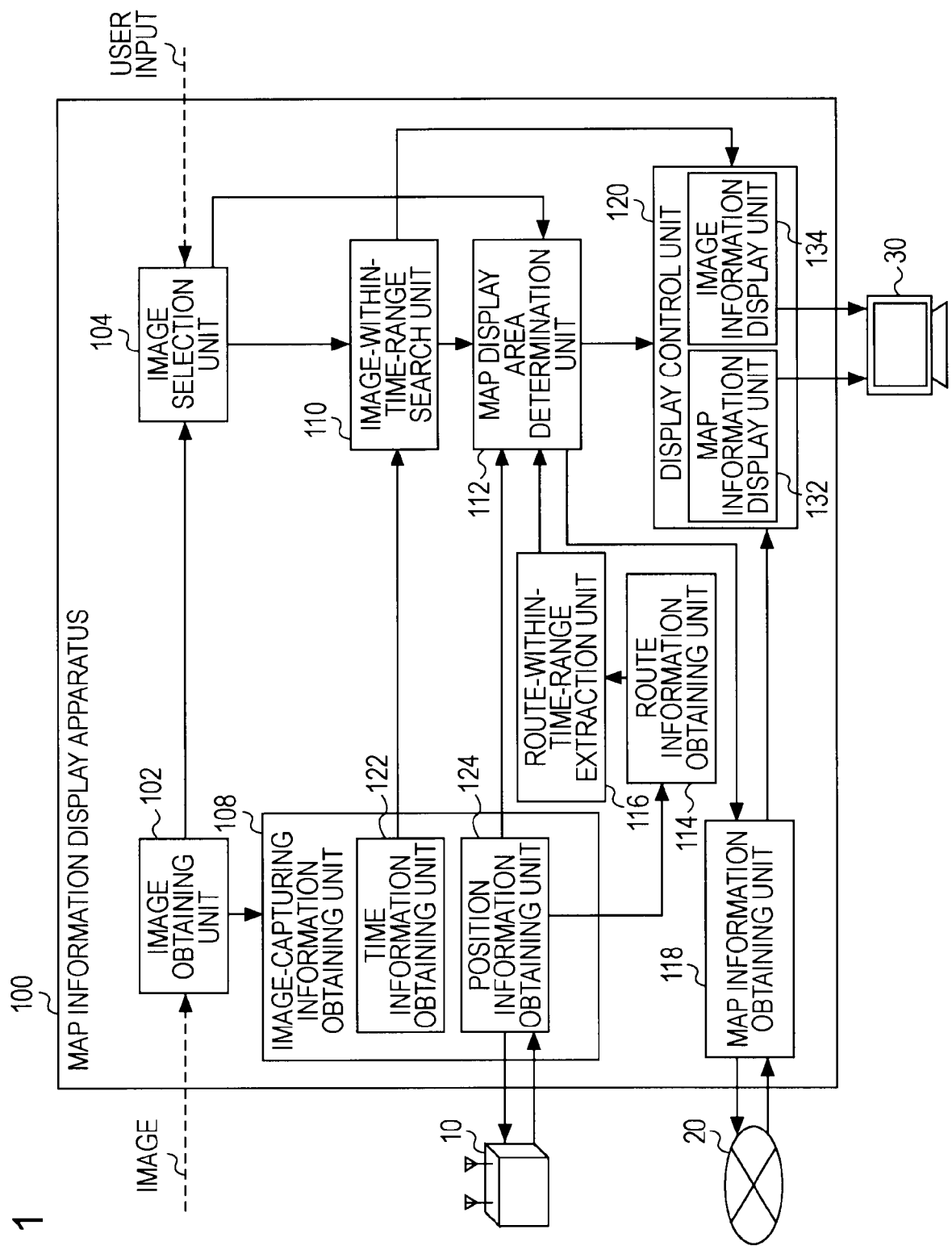
FIG. 1 is an illustration showing the configuration of a map information display apparatus according to an embodiment of the present invention.

Preferred embodiments of the present invention will be described in detail below with reference to the drawings. In this specification and in the drawings, components having substantially the same functions are designated with the same reference numerals, and duplicated descriptions thereof are omitted.

Outline

Before describing in detail preferred embodiments of the present invention, in order to facilitate understanding of the technological concept included in the description below, an outline thereof will be described herein.

The technology according to an embodiment to be described later is related to a display technology for adjusting the display area over which map information is displayed and displaying the map information.

Hitherto, when map information is to be displayed on the basis of the image-capturing position of a predetermined captured image (for example, the most recently captured image), in the case that the display area and the scale of the map information are fixed, there is a case in which the display area differs from the display area desired by the user, and the display is one that is somewhat difficult to view. Accordingly, the technology according to the embodiment to be described later is designed to provide a method and an apparatus for determining the display area over which map information is displayed so that the display becomes an easy-to-view display.

There has been considered as an example a method, which is related to such a technology, for displaying a map in which all the positions included in the information are contained on the basis of, for example, information on an image-capturing position (latitude and longitude, etc.) at which video content included in a certain playlist was captured and the image-capturing area thereof, or on the basis of information, such as the speed of the movement in the image-capturing itinerary thereof and the playback speed of the video content. Furthermore, another possible example of the method is that, after the playlist is automatically classified on the basis of the information on the date and time and image-capturing places described in the playlist or on the basis of information on photographers and the like, a map area for each playlist is determined by using as a reference the image-capturing position of the video content described in the playlist. In addition, another possible example of the method is that captured images are grouped on the basis of the distance between image-capturing positions regarding a plurality of captured images, and the display area of the map is determined for each group.

These exemplified methods are considered to be very useful in a case in which a user who just returned from a journey wants to refer to a map when classifying images captured at a journey destination or wants to be immersed in memories while looking back over the itinerary. However, when the user desires to pay attention to a particular captured image and look back on places and situations in which image capturing was performed before and after the image-capturing time of the captured image, it is easily imagined that what is important to the user are the route used to reach the image-capturing location of the captured image of interest, captured images of buildings, famous places, and the like located in the neighborhood. In such a case, even if captured images are classified or the display area of the map is adjusted for each classification, it does not contribute much to the convenience for the user and the improvement in the ease of viewing.

Accordingly, the technology according to the embodiment (to be described later) is designed for the user to comparatively easily obtain information, for example, on what kind of building is in the vicinity of the image-capturing position of the captured image of interest, what kind of image-capturing was performed, or what route the user used to reach the location.

Furthermore, when referring to a route and an image-capturing itinerary, the user may change the captured image of interest and scroll the display screen on which map information is displayed. However, if the display area of the map information is not ingeniously determined, when a captured image is to be changed, a scrolling process may have to be performed frequently, which is troublesome for the user. Accordingly, regarding a technology according to the embodiment (to be described later), a technology related to a scrolling process for reducing such inconvenience is also provided.

Although described in detail later, a technology according to the embodiment (to be described later) allows the image-capturing position of an image captured within a predetermined time period (for example, 10 minutes) to be displayed on a map by using as a reference the image-capturing time of a captured image specified by the user. Furthermore, it is possible for the technology to determine and display the display area of the map corresponding to the route that the user used. For this reason, it is possible to realize the above-described display matching how the user feels. Furthermore, when the specified captured image is to be changed, whether or not the display screen should be scrolled is determined in response to the display position on the map on the basis of the image-capturing position of the changed captured image and therefore, the number of times the user is necessary to perform a scrolling process can be reduced.

First Embodiment

A first embodiment of the present invention will be described first. This embodiment features a technology for displaying map information of a suitable display area that is determined by using as a reference an image-capturing position or an image-capturing time of a predetermined captured image by using information on image-capturing times and image-capturing positions that are respectively associated with a plurality of captured images. In the following, functions of a map information display apparatus 100 that realizes such a technology will be described, and then a map information display method using the map information display apparatus 100 will be described.

Functions of Map Information Display Apparatus 100

First, a description will be given below, with reference to FIG. 1, of functions of the map information display apparatus 100 according to this embodiment.

FIG. 1 is an illustration showing functions of the map information display apparatus 100 according to this embodiment.

As shown in FIG. 1, the map information display apparatus 100 mainly includes an image obtaining unit 102, an image selection unit 104, an image-capturing information obtaining unit 108, an image-within-time-range search unit 110, a map display area determination unit 112, a route information obtaining unit 114, a route-within-time-range extraction unit 116, a map information obtaining unit 118, and a display control unit 120.

Image Obtaining Unit 102

The image obtaining unit 102 obtains an image of a subject via an optical system and records the image as image data (hereinafter referred to as a "captured image"). At this time, the image obtaining unit 102 transmits an image-capturing notification informing that a captured image has been obtained to the image-capturing information obtaining unit 108. Furthermore, the image obtaining unit 102 transmits the obtained captured image or a thumbnail generated from the captured image to the image selection unit 104. The image obtaining unit 102 may include a storage unit (not shown) for recording captured images or may be connected to a removable storage medium on which captured images can be recorded or to an external storage device. In that case, the image obtaining unit 102 may collectively transmit captured images or thumbnails stored in the storage unit or the like to the image selection unit 104.

Image Selection Unit 104

The image selection unit 104 is a selection unit configured to select one or more captured images from among the captured images obtained by the image obtaining unit 102. The image selection unit 104 may include, for example, a display unit (for example, a display device 30 may be used) for displaying a captured image obtained from the image obtaining unit 102 or a thumbnail thereof to the user, and an input unit for accepting user input. In that case, a captured image corresponding to the user input is selected by the image selection unit 104. The image selection unit 104 transmits information on the selected captured image (hereinafter referred to as a "selected image") to the image-within-time-range search unit 110 and the map display area determination unit 112.

Image-Capturing Information Obtaining Unit 108 (Time Information Obtaining Unit 122, Position Information Obtaining Unit 124)

The image-capturing information obtaining unit 108 is a unit for obtaining information on the image-capturing time and the image-capturing position of the captured image obtained by the image obtaining unit 102. For example, the image-capturing information obtaining unit 108 includes a time information obtaining unit 122 and a position information obtaining unit 124. Furthermore, the image-capturing information obtaining unit 108 may include a storage unit (not shown) for recording captured images in such a manner that information on image-capturing times and information on image-capturing positions are associated with each other.

The time information obtaining unit 122 is a unit for obtaining information on an image-capturing time. For example, the time information obtaining unit 122 obtains time information from a time-measuring unit (not shown) possessed by itself or another time-measuring device in response to an image-capturing notification received from the image obtaining unit 102 and determines an image-capturing time for each captured image. Thereafter, the time information obtaining unit 122 transmits the obtained information on the image-capturing time to the image-within-time-range search unit 110.

The position information obtaining unit 124 is a unit for obtaining information on an image-capturing position. For example, the position information obtaining unit 124 obtains position information on the map information display apparatus 100 at that time in response to an image-capturing notification received from the image obtaining unit 102 and determines an image-capturing position for each captured image. The position information may be, for example, information indicating the latitude and longitude at which the map information display apparatus 100 is positioned or information indicating the position of a nearby base station 10. Furthermore, the position information obtaining unit 124 may obtain position information from the base station 10, a satellite system for position measurement, or the like at predetermined time intervals, and may determine the position information when an image-capturing notification is received from the image obtaining unit 102 to be an image-capturing position. Thereafter, the position information obtaining unit 124 transmits the information on the image-capturing position to the map display area determination unit 112 and the route information obtaining unit 114. The position information obtaining unit 124 may store the position information and may transmit the stored position information as route information to the route information obtaining unit 114.

Image-within-Time-Range Search Unit 110

The image-within-time-range search unit 110 is a unit for extracting an image captured within a predetermined time period by using as a reference the image-capturing time of the captured image selected by the image selection unit 104. First, the image-within-time-range search unit 110 obtains the information on the selected image from the image selection unit 104 and obtains the information on the selected image at the image-capturing time from the time information obtaining unit 122. Next, the image-within-time-range search unit 110 refers to the information on another captured image at the image-capturing time, which is obtained from the time information obtaining unit 122, in order to search for a captured image within a predetermined time period in which the image-capturing time of the selected image is contained. Next, the image-within-time-range search unit 110 transmits the information on the captured image extracted as a result of the search process to the map display area determination unit 112.

The predetermined time period may be, for example, date and time set as desired by user input, may be a period set in any time unit, such as days, weeks, years, or the like (may be in units of one hour/one minute/one second). Furthermore, the image-within-time-range search unit 110 may extract an image captured within a predetermined time period with the image-capturing time of the selected image being the center of the time period, or may extract a captured image in such a manner that the image-capturing time of the selected image is positioned in the first half or second half of the predetermined time period by user setting. Furthermore, the image-within-time-range search unit 110 may generate the extracted captured image and the thumbnail of the selected image and may transmit the image to the display control unit 120. The image-within-time-range search unit 110 is an example of the captured image extraction unit.

Map Display Area Determination Unit 112 (in a Case where Route is Not Considered)

The map display area determination unit 112 may determine the display area of the map information on the basis of only the information on the image-capturing position of the captured image, or may determine the display area of the map information by considering the route of the map information display apparatus 100. First, a description will be given below of functions of the map display area determination unit 112 in a case where the route is not considered.

The map display area determination unit 112 is a unit for determining the display area of the map information in such a manner that the image-capturing position of the captured image extracted by the image-within-time-range search unit 110 is contained by using the image-capturing position of the selected image as a reference. At this time, the map display area determination unit 112 may determine the display area of the map information in such a manner that, with the image-capturing position of the selected image being the center, all the image-capturing positions of the captured images extracted by the image-within-time-range search unit 110 are contained. Furthermore, by considering a predetermined margin, the map display area determination unit 112 may extend the display area of the map information determined by using the image-capturing position of the captured image as a reference in an amount equal to a predetermined range, and may determine the display area of new map information.

For making determination as described above, first, the map display area determination unit 112 obtains the information on the image-capturing position of the selected image from the position information obtaining unit 124. Next, the map display area determination unit 112 obtains the information on the image-capturing position of the captured image extracted by the image-within-time-range search unit 110 from the position information obtaining unit 124. Thereafter, the map display area determination unit 112 determines the display area of the map information on the basis of the information on the image-capturing position of the obtained selected image and the information on the image-capturing position of the captured image extracted by the image-within-time-range search unit 110. Thereafter, the map display area determination unit 112 transmits the information on the display area of the map information to the map information obtaining unit 118.

When the selected image is changed by the image selection unit 104 in response to a user operation, the map display area determination unit 112 determines whether or not the image-capturing position of the new selected image is contained in the display area of the original map information. When the image-capturing position of the new selected image is contained, the map display area determination unit 112 maintains the display area of the map information without changing it. On the other hand, when the image-capturing position of the new selected image is not contained, the map display area determination unit 112 determines the display area of the map information by using the new selected image as a reference.

The process for changing the display area of the map information will be described in detail later. The map display area determination unit 112 is an example of the map area selection unit and the changed-image position determination unit.

Route Information Obtaining Unit 114

The route information obtaining unit 114 is a unit for obtaining route information on the map information display apparatus 100. As described above, the position information obtaining unit 124 can obtain the position information on the map information display apparatus 100 in response to predetermined time intervals or an image-capturing notification. For this reason, the route information obtaining unit 114 obtains the position information on the map information display apparatus 100, which is associated with time information, from the image-capturing information obtaining unit 108, thereby making it possible to obtain route information indicating the route of the map information display apparatus 100. Furthermore, the route information obtaining unit 114 transmits the obtained route information to the route-within-time-range extraction unit 116. Examples of the route information include position information on the movement location of the map information display apparatus 100 and time information at which the position information was obtained.

Route-within-Time-Range Extraction Unit 116

The route-within-time-range extraction unit 116 extracts the route information obtained within a predetermined time period. The predetermined time period may be, for example, a time period set as desired or may be a predetermined time period used when the image-within-time-range search unit 110 extracts a captured image. Furthermore, the route-within-time-range extraction unit 116 transmits the extracted route information to the map display area determination unit 112. The route-within-time-range extraction unit 116 is an example of the route information extraction unit.

Map Display Area Determination Unit 112 (in a Case where Route is Considered)

The map display area determination unit 112 refers to the position information of the route information extracted by the route-within-time-range extraction unit 116 and determines the display area of the map information so that the position information is contained therein. For example, the map display area determination unit 112 may determine the display area of the map information in such a manner that, by using the image-capturing position of the selected image as a reference, the image-capturing position of the captured image extracted by the image-within-time-range search unit 110 and the position information of the route information extracted by the route-within-time-range extraction unit 116 are contained. At this time, the map display area determination unit 112 may determine the display area of the map information in such a manner that, with the image-capturing position of the selected image being the center, all the image-capturing positions of the captured images are contained and all the position information of the route information is contained. Of course, the map display area determination unit 112 may determine the display area of the map information to be larger by considering a predetermined margin.

Map Information Obtaining Unit 118

The map information obtaining unit 118 is a unit for obtaining map information on the basis of the display area of the map information determined by the map display area determination unit 112. For example, the map information obtaining unit 118 may obtain map information via a wide-area or local network 20, or may obtain map information stored inside or outside of a storage device (not shown) of the map information display apparatus 100. At this time, the map information obtaining unit 118 obtains map information in which at least the display area determined by the map display area determination unit 112 is contained.

The map information may include, in addition to image data of a so-called map, position/direction information, such as the scale, the direction, and the latitude and longitude. Furthermore, the map information may include, in addition to geographical and geomorphical information, information on buildings that exist at each location, place names, and the like. Furthermore, when the map information is divided into areas in a mesh form, the map information obtaining unit 118 may prefetch the map information on the area around the place in addition to the map information containing the above-described display area. At this time, the map information obtaining unit 118 performs a process for prefetching map information on the basis of the boundary information on the display area. This prefetching process enables a processing speed when a scrolling process is performed to be increased. The map information obtaining unit 118 transmits the obtained map information to the display control unit 120.

Display Control Unit 120 (Map Information Display Unit 132, Image Information Display Unit 134)

The display control unit 120 is a control unit for displaying map information obtained by the map information obtaining unit 118 on the display device 30 on the basis of the display area determined by the map display area determination unit 112. Furthermore, the display control unit 120 displays an indicator used to show, on a map, the image-capturing position of the selected image and the captured image extracted by the image-within-time-range search unit 110. Furthermore, the display control unit 120 displays the selected image or the thumbnail thereof in a display area differing from the display area in which the map information is displayed on the display device 30. For this reason, the display control unit 120 includes a map information display unit 132 and an image information display unit 134.

The map information display unit 132 is a control unit for displaying the map information obtained by the map information obtaining unit 118 on the display device 30. Furthermore, the map information display unit 132 displays an indicator used to indicate the image-capturing position of the captured image (including the selected image) on a map. At this time, the map information display unit 132 may display a first indicator with which the image-capturing position of the selected image is shown and a second indicator with which the image-capturing position of the captured image other than the selected image is shown in such a manner as to be distinguished from each other. In that case, the first and second indicators may be represented in, for example, a representation format in which shape, color, or the like are different, or may be represented using the selected image or the thumbnail of the captured image. Furthermore, the first and second indicators may be represented using icons or the like that are associated with selected images or captured images.

Furthermore, when the route information is obtained, the map information display unit 132 may display the obtained position of the route information on the map. At this time, the map information display unit 132 may display a third indicator indicating the obtained position of the route information on the map. The third indicator may be represented in a representation format that enables the third indicator to be distinguished from the first and second indicators, or may be represented using an icon associated with route information, or the like.

Furthermore, the map information display unit 132 displays display area information indicating the display area of the map information determined by the map display area determination unit 112 on the display device 30. Then, when the display area is updated in response to a user operation, the map information display unit 132 changes the display area on the display device 30 so as to fit to the display area on the new map by scrolling or expanding/reducing the display area on the display device 30.

Furthermore, the map information display unit 132 displays connection information for connecting between image-capturing positions displayed on the map or for chronologically connecting between obtained positions of the route information. For example, the map information display unit 132 chronologically arranges the information on the image-capturing positions on the basis of the information on the image-capturing time, connects indicators corresponding to image-capturing positions that are consecutive with respect to time by using a straight line, a curve, or the like, and displays the indicators. The connection information may be any representation format in addition to a straight line and a curve as long as a connection relationship between indicators is represented. The map information display unit 132 is an example of the indicator information display unit.

On the other hand, the image information display unit 134 is a control unit for displaying a selected image or a thumbnail thereof in a display area differing from the display area displayed on the display device 30 by the map information display unit 132. Furthermore, when the selected image is changed in response to a user operation, the image information display unit 134 changes the captured image displayed in the other display area to a new selected image. In addition, when any desired indicator displayed on the map is selected in response to a user operation, the image information display unit 134 displays the captured image corresponding to the indicator or the thumbnail thereof in the other display area.

Up to this point, the functions of the map information display apparatus 100 according to this embodiment have been described. As described above, when the map information display apparatus 100 according to this embodiment is used, in the case that information on an image-capturing position or the like is to be displayed on a map, an appropriate display area is selected on the basis of the image-capturing information corresponding to the captured image. Therefore, it is possible to greatly improve the convenience to the user. In particular, in an image-capturing device using the small display device 30, or the like, a display format considerably easy to view is realized. In the following, a map information display method implemented by the map information display apparatus 100 will be described below.

Map Information Display Method

Figure 2:
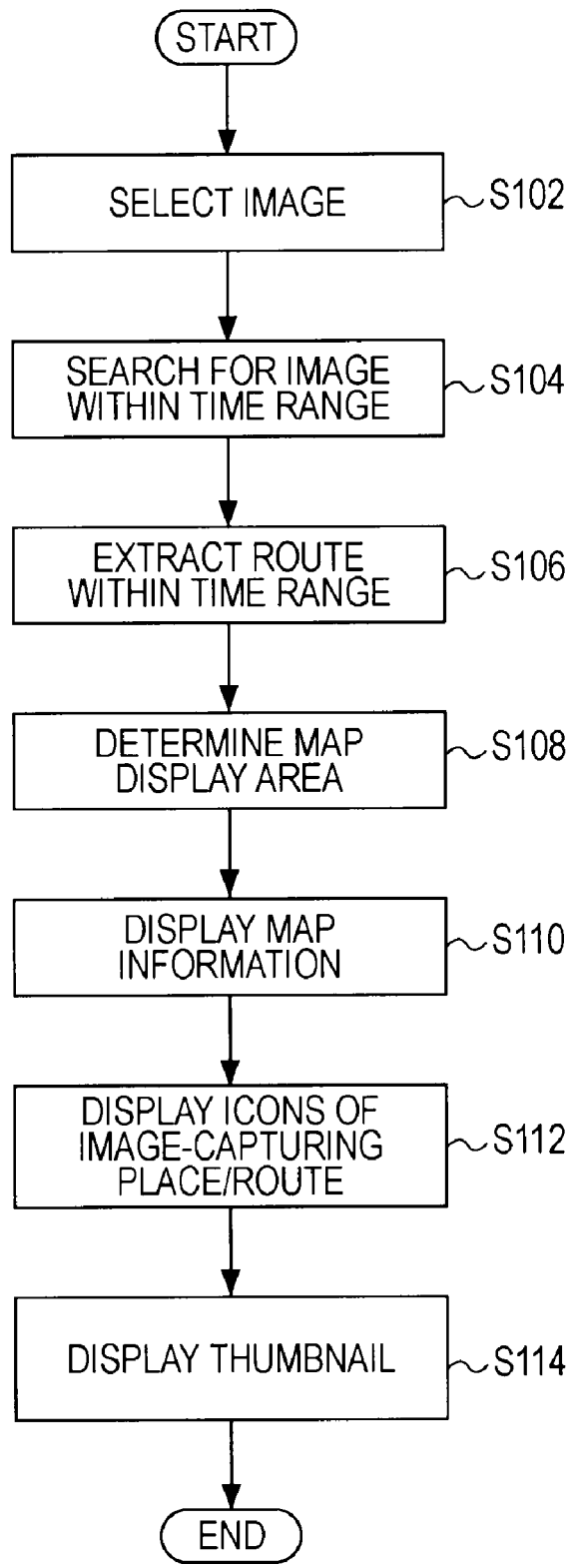
FIG. 2 is an illustration showing the flow of the map information display method according to the embodiment of the present invention.

Referring to FIG. 2, a map information display method according to this embodiment will now be described. FIG. 2 is an illustration showing the flow of the map information display method according to this embodiment.

Flow of Processing

As shown in FIG. 2, first, a captured image is selected by the image selection unit 104 (S102). In step S102, the captured image may be selected by user input, or the most recently captured image obtained by the image obtaining unit 102 may be selected. For example, in a case of immediately after proceeding to a map display mode, the most recently captured image is selected, and in the other cases, the captured image may be selected by the user.

Next, the image-within-time-range search unit 110 searches for an image captured within a predetermined time period (S104). In step S104, the image-within-time-range search unit 110 obtains information on the selected image at the image-capturing time from the image-capturing information obtaining unit 108 and also searches for an image captured within a predetermined time period by using the image-capturing time as a reference. For example, in step S104, the image-within-time-range search unit 110 searches for another image captured within 10 minutes before and after the image-capturing time of the selected image. Then, the image-within-time-range search unit 110 obtains information (for example, an image-capturing position list) on the image-capturing position of the captured image extracted by the search process.

Next, the route-within-time-range extraction unit 116 extracts route information in which the obtained time is contained within the predetermined time period (S106). In step S106, for example, the route-within-time-range extraction unit 116 obtains the image-capturing time of the selected image and searches for route information obtained within 10 minutes before and after that time. Furthermore, the route-within-time-range extraction unit 116 extracts information (for example, an obtained position list) on the obtained position of the route information extracted by the search process. The route information is, for example, aggregate data containing position information and time information, which are obtained at regular intervals, such as "every second" or "every five seconds".

Next, the map display area determination unit 112 determines the display area of the map information on the basis of the image-capturing position of the captured image and the obtained position of the route information (S108). In step S108, the map display area determination unit 112 obtains, for example, the image-capturing position list and the obtained position list described above, and compares the information on the latitude and longitude of the selected image with the information on the latitude and longitude contained in the image-capturing position list and the obtained position list. Then, the map display area determination unit 112 computes the distance to the image-capturing position of the captured image farthest from the image-capturing position of the selected image with respect to each of the latitude direction and the longitude direction.

Furthermore, the map display area determination unit 112 determines the display area of the map information by adding or subtracting a distance such that a predetermined margin (for example, 20%) is added to that distance to each of the latitude and the longitude of the selected image. However, the map display area determination unit 112 may determine the display area on the basis of the actual distance between the above-described positions. This deals with a case in which the latitude/longitude do not intersect at right angles to each other according to a drawing method of a map, or the like. As described above, in this embodiment, the display area may be determined by using a calculation method appropriate for the drawing method of a map.

Next, the map information display unit 132 displays map information on the display device 30 in such a manner that the display area determined by the map display area determination unit 112 is displayed (S110). In step S110, the map information display unit 132 converts the map information obtained by the map information obtaining unit 118 into display data suitable for the display device 30 and displays the display data on the display device 30.

Next, the map information display unit 132 displays indicators, such as icons, for displaying the image-capturing position of the captured image (including the selected image) and the obtained position of the route information on the display device 30 (S112). In step S112, the map information display unit 132 refers to, for example, the image-capturing position list and the obtained position list described above, and displays, on a map, icons associated with the image-capturing position of the captured image and the obtained position of the route information. Furthermore, the map information display unit 132 displays the icon associated with the image-capturing position of the selected image in a display format in which the icon is distinguishable from the other icons. For example, the map information display unit 132 may cause an icon corresponding to the image-capturing position of the selected image to blink.

Next, the image information display unit 134 displays the selected image or the thumbnail of the selected image in a display area differing from the display area displayed by the map information display unit 132 (S114). However, the other display area may be displayed in such a manner as to be superposed in the display area displayed by the map information display unit 132, or may be displayed as a display area that is completely separated.

The flow of the map information display method according to this embodiment has been described above. Next, an example of the display of map information by the map information display method will be described specifically.

Example of Display

Figure 3:
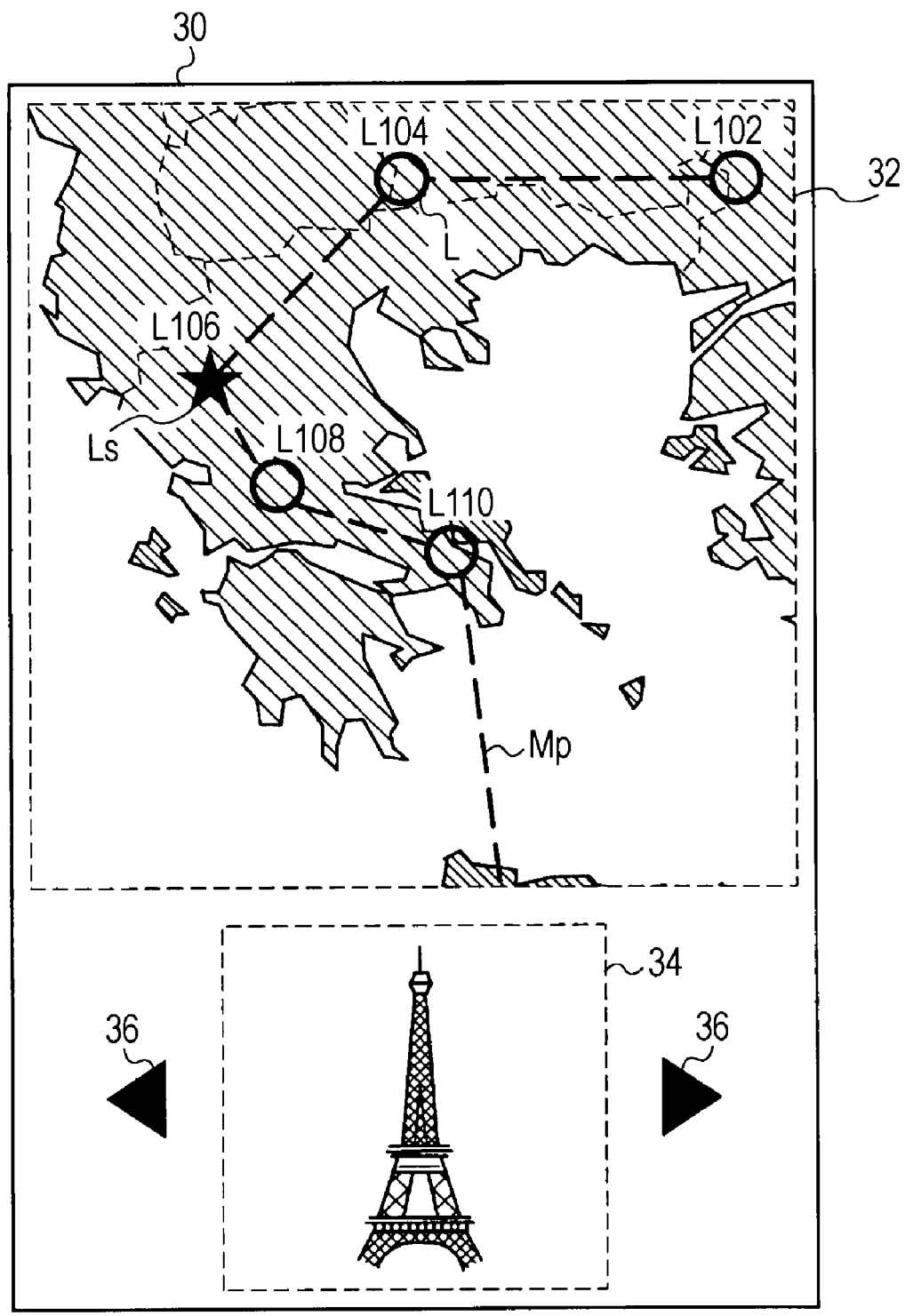
FIG. 3 is an illustration showing an example of the structure of a map information display screen according to the embodiment of the present invention.

A description will be given below, with reference to FIGS. 3 and 4, of an example of the display of map information according to this embodiment. FIG. 3 is an illustration showing an example of map information according to this embodiment. FIG. 4 is an illustration showing a transition process of map information display according to this embodiment.

As shown in FIG. 3, for example, a map display area 32, an image display area 34, and a movement button 36 are displayed on the display device 30.

In the map display area 32, map information is displayed, and in that map, each indicator (L, Ls) and connection information (Mp) are displayed. The indicator L of a circle mark is an indicator indicating a location and corresponds to the image-capturing position of a captured image. The indicator Ls of an asterisk mark is an indicator indicating a selection location and corresponds to the image-capturing position of the selected image. A chain line Mp corresponds to a movement locus, which is an example of connection information. Reference numerals L102, L104, L106, L108, and L110 each denote an image-capturing location. For the convenience of description, it is assumed that image capturing has been performed in the order of L102→L104→L106→L108→L110.

On the other hand, in the image display area 34, a selected image corresponding to the selection location Ls or the thumbnail thereof is displayed. Furthermore, the movement button 36 is a button for switching between a selected image displayed in the image display area 34 and the thumbnail thereof. The selection location Ls is moved to another adjacent location L in response to the operation direction of the movement button 36.

The display of the map display area 32 is implemented by the functions of the map information display unit 132. On the other hand, the display of the image display area 34 is implemented by the functions of the image information display unit 134. Furthermore, the movement process of the selection location Ls in response to an operation of the movement button 36 is implemented in cooperation with functions of the image selection unit 104 and the display control unit 120.

Figure 4A:
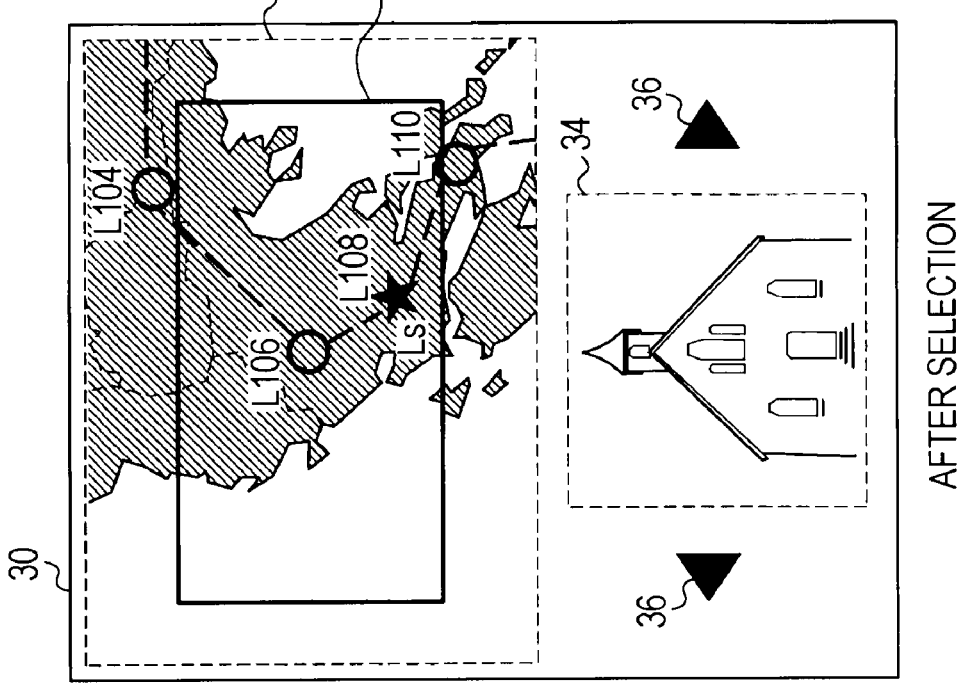
FIG. 4 is an illustration showing a method of changing map information display according to the embodiment of the present invention.
Figure 4B:
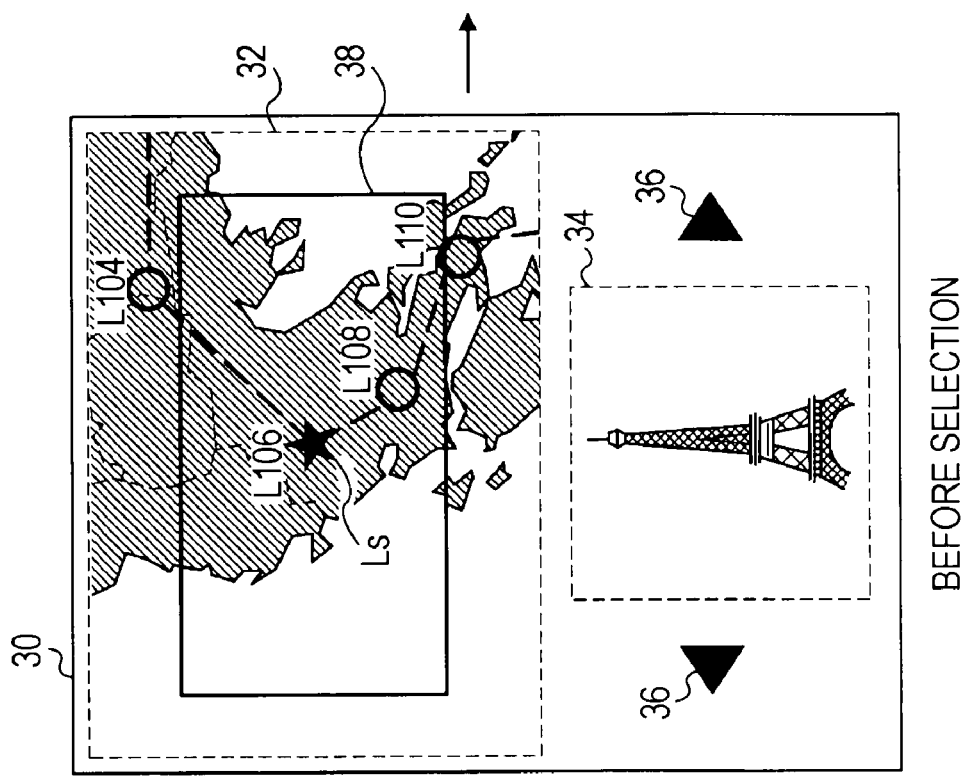

Based on the above-described screen structure, a reference is made to FIG. 4. Part (A) of FIG. 4 shows a display screen, which is substantially the same as that of FIG. 3. However, in FIG. 4A, in addition to those of FIG. 3, a reference display area 38 is shown. The reference display area 38 is a display area determined by the map display area determination unit 112 on the basis of the image-capturing position of the captured image and the obtained position of the movement locus information.

In the example of part (A) of FIG. 4, an image-capturing location L106 is selected as a selection location Ls. Here, a case is considered in which the movement button 36 is operated and the selection location Ls is moved to the image-capturing location L108. For example, the user operates the movement button 36 on the right side that is used to move the selection location Ls to a location ahead with respect to time in order to move the selection location Ls to an image-capturing location L108.

Then, the map display area determination unit 112 determines whether or not the new selection location Ls (image-capturing location L108) is contained in the original reference display area 38. In the case of part (A) of FIG. 4, the image-capturing location L108 is positioned inside the reference display area 38. Therefore, the map display area determination unit 112 does not change the display area of the map information. For this reason, the display control unit 120 causes the selection location Ls to be moved to the image-capturing location L108 without changing the position of the reference display area 38. The movement of the selection location Ls means a process for changing the indicator of the location (image-capturing location L108) of the movement destination to an indicator indicating a selection location and changing the indicator of the location (image-capturing location L106) of the movement source to an indicator indicating a location other than the selection location.

As a result of the above-described movement process, the display structure shown in part (B) of FIG. 4 is formed. Part (B) of FIG. 4 shows a display structure after the selection location Ls is moved to the image-capturing location L108. When the selection location Ls is moved in this manner, the display of the image display area 34 is changed by the image information display unit 134. At this time, in the image display area 34, the image captured at the image-capturing location L108 or the thumbnail thereof is displayed.

As described above, when the display area of the map information is appropriately determined, it becomes possible for the user to easily switch and browse captured images even if the map information that is displayed by using a predetermined captured image as a reference is not expanded/reduced or a scrolling process is not performed. Furthermore, when the display area is determined on the basis of the movement locus, it is possible to browse captured images while remembering the itinerary thereof and confirming a main route. In the following, a description will be given of a scrolling process in a case where the above-described display technology is further advanced and the selection location Ls is moved to outside the reference display area 38.

Scrolling Processing Method

Figure 5:
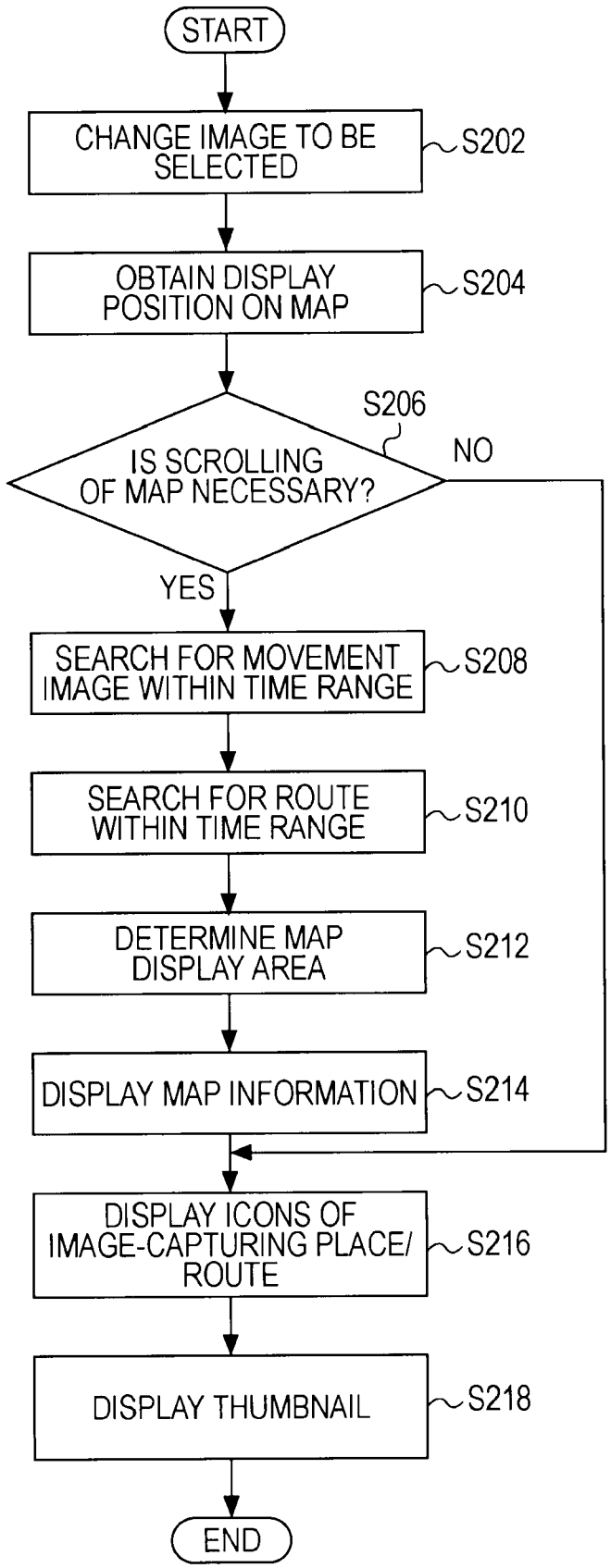
FIG. 5 is an illustration showing the flow of the map information display method according to the embodiment of the present invention.
Figure 6A:
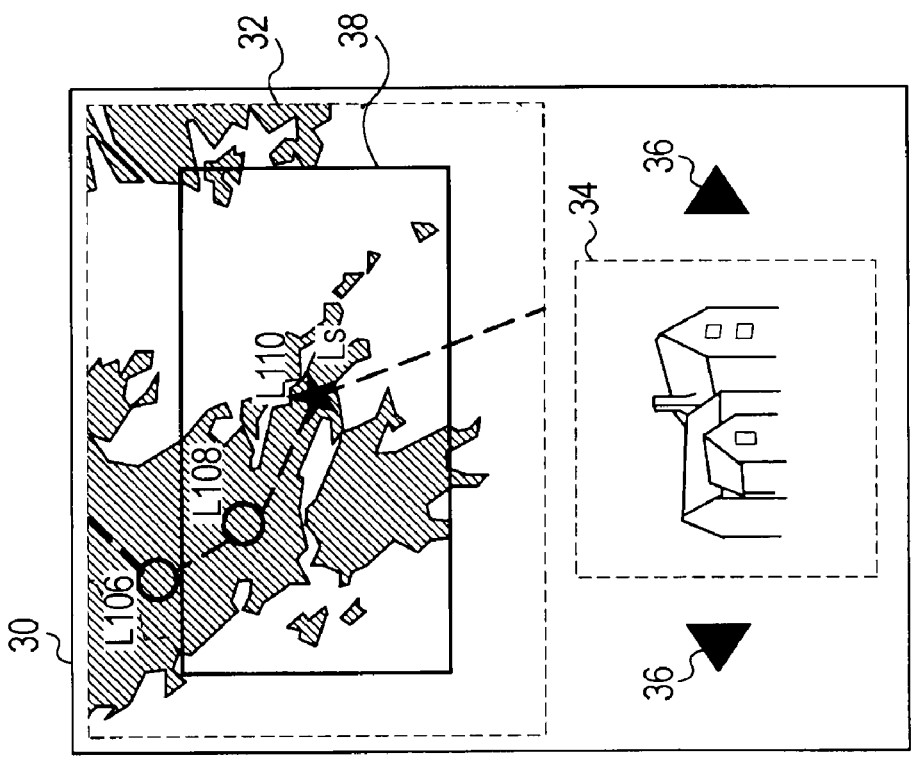
FIG. 6 is an illustration showing a method of changing map information display according to the embodiment of the present invention.
Figure 6B:
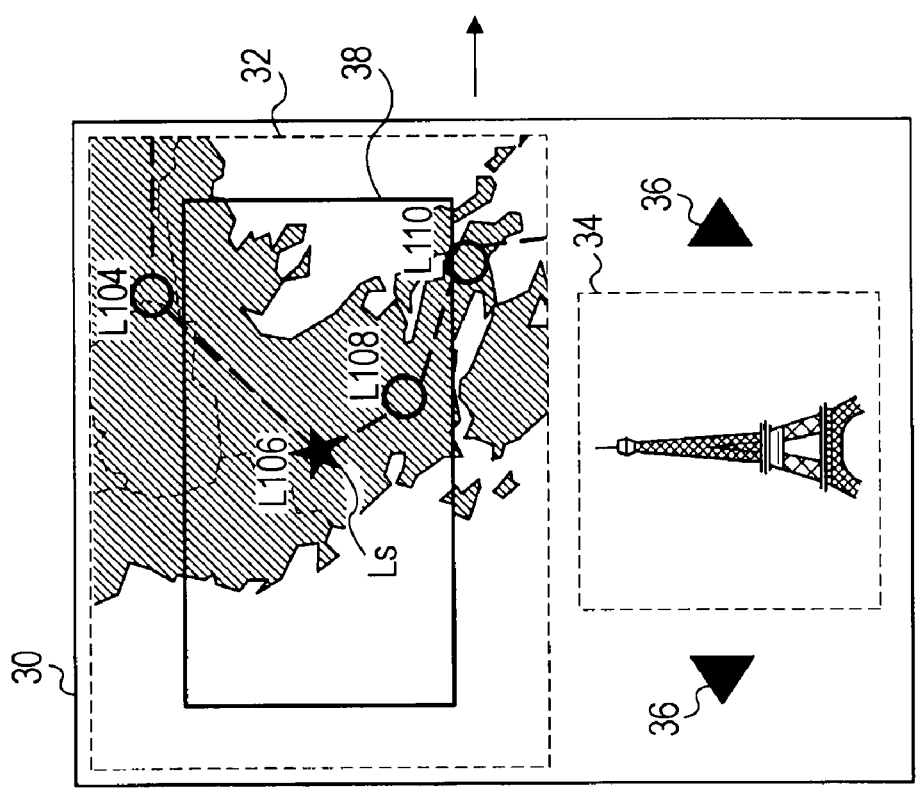

Next, a description will be given, with reference to FIGS. 5 and 6, of a process for scrolling map information according to this embodiment. FIG. 5 is an illustration showing the flow of a process for scrolling map information according to this embodiment. FIG. 6 is an illustration showing the transition process of map information display according to this embodiment.

Flow of Processing

First, FIG. 5 is referred to. As shown in FIG. 5, when the selection location Ls is moved by the user and the selected image is changed (S202), the map display area determination unit 112 obtains the image-capturing position (selection location Ls) of a new selected image (S204). Next, the map display area determination unit 112 determines whether or not the new selection location Ls is positioned inside the reference display area 38 in order to determine whether or not it is necessary to scroll the display area of the map information (S206). When scrolling is necessary, the map information display apparatus 100 proceeds to the process of step S208. Conversely, when scrolling is not necessary, the map information display apparatus 100 proceeds to the process of step S216.

In step S208, the image-within-time-range search unit 110 searches for an image captured within a predetermined time period by using the new selected image as a reference and extracts it (S208). Next, the route-within-time-range extraction unit 116 searches for and extracts route information such that the obtained time of the route information is contained within the predetermined area (S210). Next, the map display area determination unit 112 redetermines the display area on the basis of the image-capturing position of the captured image extracted in step S208 and on the basis of the obtained position of the route information extracted in step S210 (S212). Next, the map information display unit 132 displays the map information on the basis of the display area of the map information redetermined in step S212 (S214).

The processing of steps S208 to S214 described above corresponds to the processing of steps S104 to S110 of FIG. 2, respectively. However, the processing of steps S208 to S214 differs in that a new selected image is used, and in response to the display area being changed, the display screen is scrolled.

In step S216, the map information display unit 132 displays, on the display device 30, indicators such as icons for displaying the image-capturing position of a captured image (including a selected image) and the obtained position of the route information (S216).

Next, the image information display unit 134 displays the selected image or the thumbnail of the selected image in a display area differing from the display area displayed by the map information display unit 132 (S218).

By performing the above-described processing steps, a process for scrolling the display screen is implemented. In the following, an example of a specific display regarding the scrolling process is shown, and a brief description is given.
Example of Display The example of display for when scrolling is not necessary has already been described with reference to FIG. 4. Here, referring to FIG. 6, a case in which scrolling is necessary is considered. Part (A) of FIG. 6 shows the same display structure as that of part (A) of FIG. 4. On the other hand, part (B) of FIG. 6 shows a display structure in a case where the selection location Ls is moved from the image-capturing location L106 to an image-capturing location L110. This movement is realized by, for example, pressing the movement button 36 on the right side two times.

Referring to part (A) of FIG. 6, the image-capturing location L110, which is the movement destination of the selection location Ls, is positioned outside the reference display area 38. For this reason, the map display area determination unit 112 determines that it is necessary to scroll the display area of the map information.

Therefore, the map display area determination unit 112 determines the display area in which the map information is displayed in such a manner that, for example, the image-capturing location L110 is positioned in the center of the reference display area 38. Then, map information appropriate for the display area is obtained by the map information obtaining unit 118. Next, the map information shown in part (B) of FIG. 6 is displayed by the map information display unit 132. Furthermore, the indicator displayed at the image-capturing location L110 is changed to that for the selection location Ls by the map information display unit 132, and the indicator displayed at the image-capturing location L106 is changed to that for the location L. Furthermore, the display of the image display area 34 is updated to the image captured at the image-capturing location L110 or the thumbnail thereof by the image information display unit 134.

The map information display method according to this embodiment has been described above. When map information is to be displayed by using as a reference the image-capturing position of a predetermined captured image (for example, the most recently captured image), in the case that the display area and the scale of the map information are fixed, there is a case in which the display area differs from the display area desired by the user, and a slightly difficult-to-view display is formed. However, when the map information display method is applied, the display area of the map information is determined on the basis of one or both of the image captured within a predetermined time period in response to the image-capturing time of the predetermined captured image and the obtained position of the route information obtained within the predetermined time period. For this reason, even when a captured image to be browsed is changed, easy-to-view map display for the user is realized without scrolling unnecessarily.

Hardware Configuration (Example of Image-Capturing Device)

Figure 7:
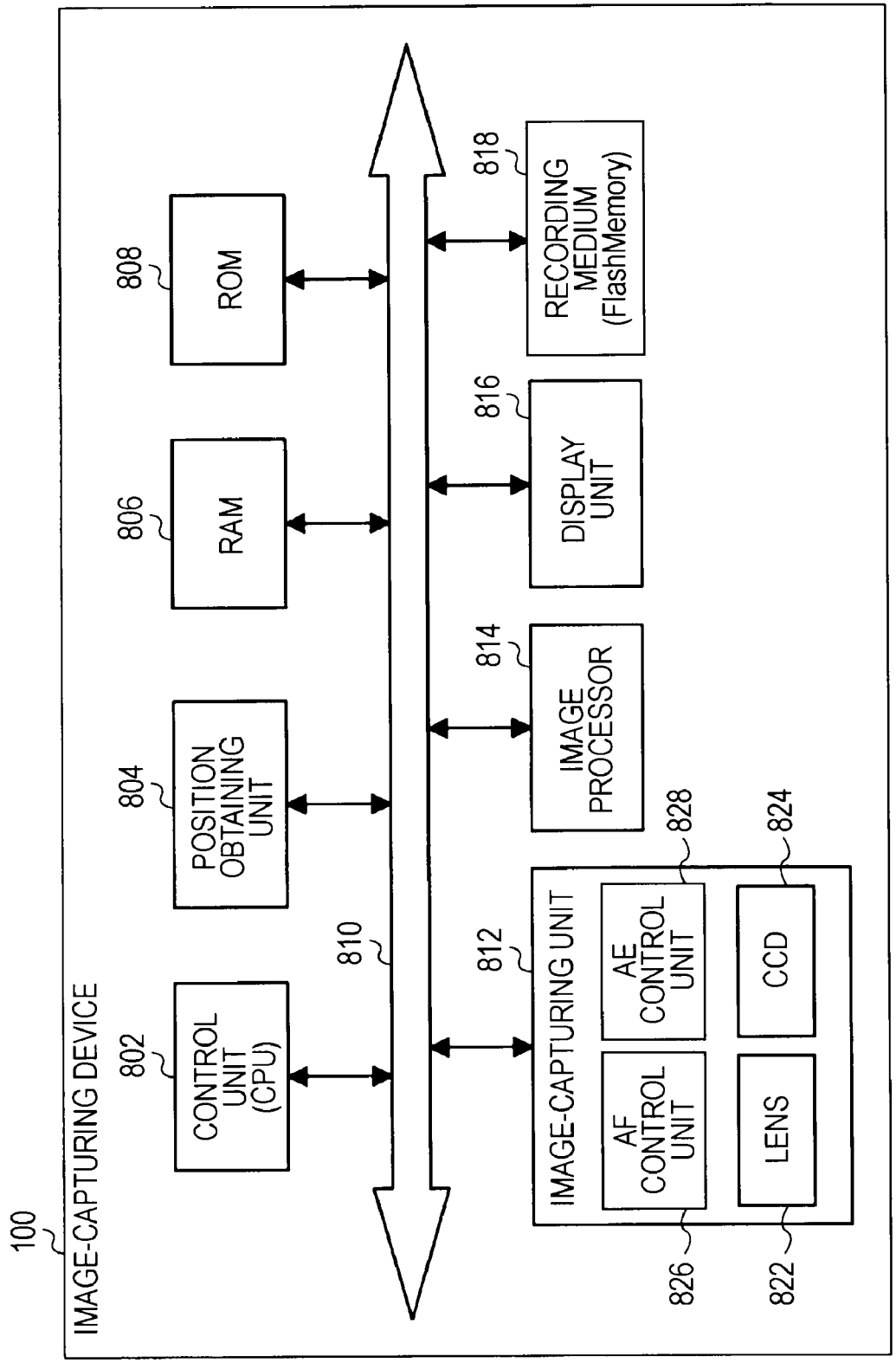
FIG. 7 is an illustration showing an example of hardware configuration of an image-capturing device according to the embodiment of the present invention.

The functions of the components of the above-described device can be realized by, for example, an image-capturing device having hardware configuration shown in FIG. 7. FIG. 7 is an illustration showing the hardware configuration of the image-capturing device capable of implementing the functions of the components of the device.

As shown in FIG. 7, the image-capturing device mainly includes a control unit (for example, a central processing unit (CPU) 802, a position obtaining unit 804, a random access memory (RAM) 806, a read-only memory (ROM) 808, a bus 810, an image-capturing unit 812, an image processor 814, a display unit 816, and a storage medium (for example, a flash memory, etc.) 818.

Although not shown in the figure, the image-capturing device may further include an input unit for accepting operation by the user. The functions of the input unit are implemented by operation units, such as a mouse, a keyboard, a touch panel, a button, a switch, and a lever. Furthermore, the input unit may be a remote control unit (a so-called remote controller) capable of transmitting a control signal by using infrared or other radio waves, or light waves.

The control unit 802 is implemented using, for example, a CPU, and controls the whole or part of the operations of the components in accordance with various kinds of programs recorded in the RAM 806, the ROM 808, the recording medium 818, and the like. The ROM 808 has stored therein, for example, programs to be read into the control unit 802, data used for computations, and the like. The RAM 806 temporarily or permanently stores, for example, a program to be read to the control unit 802, and various kinds of parameters that change as appropriate when the program is executed. These components are interconnected with one another through the bus 810 capable of high-speed data transmission.

The position obtaining unit 804 is a unit for obtaining the position information of the image-capturing device. The position information obtaining unit 804 may access, for example, a communicable base station and may obtain the information on an area covered by such a base station as position information, or may obtain position information from a satellite system (global positioning system (GPS)) for position measurement. The position information is, for example, information capable of specifying the latitude and longitude or an area in which the image-capturing device is positioned.

The image-capturing unit 812 is a unit for obtaining an image of a subject via an optical system. The image-capturing unit 812 mainly includes a lens 822, a charge-coupled device (CCD) 824, an AF controller 826, and an automatic exposure (AE) controller 828.

The lens 822 constitutes the optical system and collects light reflected by a subject to the CCD 824. The CCD 824 is formed of semiconductor elements, and is a solid-state image-capturing element that receives light collected by the lens 822 using each element, and photoelectrically converts the received light and outputs it. Since the CCD 824 outputs an electrical signal in response to the intensity of the light received by each element, it is possible to form an image signal on the basis of the electrical signal. The image-capturing device may use an image sensor formed by other semiconductor elements in place of the CCD 824. The AF controller 826 is an auto-focus mechanism for automatically adjusting focus. Furthermore, the AE controller 828 is an AE control mechanism for automatically adjusting a shutter speed and an aperture value.

The image processor 814 is able to convert the image signal output by the CCD 824 into the format of image data that can be displayed on the display unit 816. For example, it is possible for the image processor 814 to convert the image signal into data having a coding format, such as BMP, GIF, JPEG, PICT, or PING. Furthermore, the image processor 814 may change the size of image data, adjust luminance and color tone, or perform adjustments such as gamma correction and sharpness. In addition, the image processor 814 may generate moving image data from a plurality of image signals that are continuously captured by the image-capturing unit 812.

The display unit 816 is, for example, a display device, such as a liquid-crystal display (LCD), a plasma display panel (PDP), and an electro-luminescence display (ELD), which is capable of visually notifying the user of obtained information. The display unit 816 may be a touch-panel type display device. In this case, the display unit 816 can also serve the function as the input unit.

The recording medium 818 is formed of a magnetic disk, an optical disc, a magneto-optical disc, a semiconductor memory, or the like. For example, the recording medium 818 is a digital versatile disc (DVD) medium, a Blu-ray medium, an HD-DVD medium, a compact flash (CF) (registered trademark), a memory stick, a secure digital (SD) memory card, a hard disk drive (HDD), or the like. Furthermore, it is possible for the image-capturing device to use, as the recording medium 818, for example, an integrated circuit (IC) card having a non-contact type IC chip installed therein, an electronic device, or the like.

For example, in the above-described embodiment, a rectangular reference display area 38 is shown as an example. Alternatively, for example, an oval shape, a polygon, or a predetermined area (for example, a region, such as a city, town or village, or a prefecture of Japan) on a map may be used for the reference display area 38. Furthermore, a process for changing an indicator as a result of changing the selected image may be performed before the map information is changed or may be performed after the map information is changed.

The technology for ingeniously determining the display area of the map information can be applied to a case in which map information, thumbnails of captured images, and the like are stored on a DVD or the like, the menu thereof is created, and information on the captured images or the like is left. In the case of a medium such as a DVD or the like, since the number of thumbnails that can be displayed in the menu is limited to a certain fixed number, there is a problem in that such a medium is not suitable for a situation in which the number of classifications of captured images or the like that are classified with reference to the information on image-capturing positions, image-capturing times, and the like becomes non-fixed.

Accordingly, a method is proposed in which the map information display method according to the above embodiment is modified, the display area of map information is determined by using as a reference the center-of-gravity position of a plurality of selected images in place of the image-capturing position of the selected image in this case, and the image selection unit 104 selects a plurality of captured images in response to user input. Then, the map display area determination unit 112 computes the center-of-gravity position with regard to the image-capturing positions of the plurality of captured images selected by the image selection unit 104, and determines the display area of the map information by using the center-of-gravity position as a reference. For example, the map display area determination unit 112 determines the display area of the map information in such a manner that the center-of-gravity position is positioned in the center. In this case, the map information display apparatus 100 may be formed of some components having necessary functions. The map display area determination unit 112 is an example of the center-of-gravity position computation unit.

For example, when a menu containing map information stored on a DVD or the like and thumbnails of captured images is to be created, a case is considered in which thumbnails of three captured images and map information are displayed in each menu. In this case, when the above-described modified method is used, the center-of-gravity position of image-capturing positions of three captured images is set at the display center position of the map, and the display area of the map information in which image-capturing positions of three captured images are contained is determined. As a consequence, menu display that is easy to view for the user is realized.

It should be understood by those skilled in the art that various modifications, combinations, sub-combinations and alterations may occur depending on design requirements and other factors insofar as they are within the scope of the appended claims or the equivalents thereof.

What is claimed is:

1. A map information display apparatus for displaying map information on the basis of information on image-capturing times and image-capturing positions that are respectively associated with a plurality of captured images, the map information display apparatus comprising:
   a captured image extraction unit configured to extract images captured within a predetermined time period that includes the image-capturing time of a predetermined captured image from among the plurality of captured images;
   a map area selection unit configured to select an area of a map so as to include the image-capturing positions of the captured images extracted by the captured image extraction unit by using as a reference the image-capturing position of the predetermined captured image; and
   a map information display unit configured to display map information in such a manner as to include the area of the map that is selected by the map area selection unit.

2. The map information display apparatus according to claim 1, wherein the map area selection unit selects the area of the map so as to include the image-capturing positions of the captured images extracted by the captured image extraction unit with the image-capturing position of the predetermined captured image being the center of the area of the map.

3. The map information display apparatus according to claim 1, further comprising an indicator information display unit configured to display first indicator information indicating the image-capturing position of the predetermined captured image within the map information.

4. The map information display apparatus according to claim 3, wherein the indicator information display unit displays, as the first indicator information, a thumbnail of the predetermined captured image or an icon corresponding to the image-capturing position of the predetermined captured image.

5. The map information display apparatus according to claim 3, wherein the indicator information display unit displays second indicator information indicating the image-capturing positions of the captured images extracted by the captured image extraction unit within the map information.

6. The map information display apparatus according to claim 5, wherein the indicator information display unit displays, as the second indicator information, thumbnails of the captured images extracted by the captured image extraction unit or icons corresponding to the image-capturing positions of the captured images.

7. The map information display apparatus according to claim 1, further comprising an image information display unit configured to display the predetermined captured image or a thumbnail of the captured image in a display area differing from a display area in which the map information is displayed by the map information display unit.

8. The map information display apparatus according to claim 1, wherein the predetermined captured image is a most recently captured image among the plurality of captured images.

9. The map information display apparatus according to claim 1, further comprising:
a route information obtaining unit configured to obtain route information indicating information on a route moved in the process of obtaining the plurality of captured images; and
a route information extraction unit configured to extract the route information obtained within the predetermined time period,
wherein the map area selection unit selects, by using the image-capturing position of the predetermined captured image as a reference, an area of a map in which image-capturing positions of the captured images extracted by the captured image extraction unit and an obtained position of the route information extracted by the route information extraction unit are contained.

10. The map information display apparatus according to claim 9, further comprising an indicator information display unit configured to display third indicator information indicating the obtained position of the route information extracted by the route information extraction unit within the map information.

11. The map information display apparatus according to claim 1, further comprising a changed-image-position determination unit configured to, when the predetermined captured image is changed to another captured image among the plurality of captured images, determine whether or not the image-capturing position of the other captured image is positioned within the area selected by the map area selection unit,
wherein the map area selection unit does not change the area of the map when the changed-image-position determination unit determines that the other captured image is positioned within the selected area, and changes the area of the map so that the other captured image is used as a reference when the changed-image-position determination unit determines that the other captured image is positioned outside the selected area.

12. A map information display apparatus for displaying map information on the basis of information on image-capturing times and image-capturing positions that are respectively associated with a plurality of captured images, the map information display apparatus comprising:
a center-of-gravity position computation unit configured to compute a center-of-gravity position of the image-capturing positions of a predetermined number of captured images selected from among the plurality of captured images;
a map area selection unit configured to select an area of the map in which the image-capturing positions of the predetermined number of captured images are contained by using the center-of-gravity position as a reference; and
a map information display unit configured to display map information in such a manner as to include the area of the map that is selected by the map area selection unit.

13. A map information display method for displaying map information on the basis of information on image-capturing times and image-capturing positions that are respectively associated with a plurality of captured images, the map information display method comprising the steps of:
extracting images captured within a predetermined time period in which an image-capturing time of a predetermined captured image is contained from among the plurality of captured images;
selecting an area of a map so as to include the image-capturing position of the captured image extracted in the captured image extraction by using as a reference the image-capturing position of the predetermined captured image; and
displaying map information in such a manner as to include the area of the map that is selected in the map area selection.

14. A non-transitory computer readable medium storing a computer program to implement functions of the map information display apparatus according to any one of claims 1 to 12.

* * * * *